United States Patent
Wagman et al.

[19]

[11] Patent Number: 6,101,305
[45] Date of Patent: *Aug. 8, 2000

[54] FIBER OPTIC CABLE

[75] Inventors: Richard S. Wagman; Eric R. Logan, both of Hickory, N.C.

[73] Assignee: Siecor Corporation, Hickory, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/990,974

[22] Filed: Dec. 15, 1997

[51] Int. Cl.$^7$ .................................................... G02B 6/44
[52] U.S. Cl. ............................ 385/113; 385/114; 385/136
[58] Field of Search ........................... 385/109, 112–114, 385/136

[56] References Cited

U.S. PATENT DOCUMENTS

| | | | |
|---|---|---|---|
| 4,534,618 | 8/1985 | Bruggendieck et al. | 350/96.23 |
| 4,610,505 | 9/1986 | Becker et al. | 350/96.23 |
| 4,761,053 | 8/1988 | Cogelia et al. | 350/96.23 |
| 4,844,575 | 7/1989 | Kinard et al. | 350/96.23 |
| 4,901,099 | 2/1990 | Sakamoto et al. | 354/324 |
| 4,909,592 | 3/1990 | Arroyo et al. | 350/96.23 |
| 5,029,974 | 7/1991 | Nilsson | 350/96.23 |
| 5,039,195 | 8/1991 | Jenkins et al. | 385/101 |
| 5,039,196 | 8/1991 | Nilsson | 385/136 |
| 5,082,719 | 1/1992 | Arroyo | 428/219 |
| 5,109,457 | 4/1992 | Panuska et al. | 385/102 |
| 5,440,665 | 8/1995 | Ray et al. | 385/135 |
| 5,448,670 | 9/1995 | Blew et al. | 385/112 |
| 5,469,523 | 11/1995 | Blew et al. | 385/101 |
| 5,509,097 | 4/1996 | Tondi-Resta et al. | 385/113 |
| 5,651,081 | 7/1997 | Blew et al. | 385/101 |
| 5,825,956 | 10/1998 | Missout et al. | 385/102 |
| 5,960,144 | 9/1999 | Klumps et al. | 385/113 |

FOREIGN PATENT DOCUMENTS

| | | | |
|---|---|---|---|
| 2428849 | 6/1978 | France | G02B 7/00 |
| 58-150907 | 9/1983 | Japan | G02B 5/16 |
| 1409303 | 10/1975 | United Kingdom | G02B 5/16 |

OTHER PUBLICATIONS

31 Mile Equipment Company, Lewis Manufacturing Company—Pulling Grips and Swivels, Sealed Swivels, R–Series Grips & Swivel Eye Grips; Internet Web Page, Oct. 1997.
31 Mile Equipment Company, Lewis Manufacturing Company—Pulling Grips and Swivels, Standard Fiber Optics Pulling Grips; Internet Web Page, Oct. 1997.
31 Mile Equipment Company, Lewis Manufacturing Company—Pulling Grips and Swivels, Standard Fiber Optics Pulling Grips — X and XIE; Internet Web Page, Oct. 1997.
31 Mile Equipment Company, Lewis Manufacturing Company—Pulling Grips and Swivels, Special Application Fiber Optics Pulling Grips; Internet Web Page, Oct. 1997.

*Primary Examiner*—John D. Lee
*Attorney, Agent, or Firm*—Timothy J. Aberle

[57] ABSTRACT

A fiber optic cable (10) having a core tube (14) with a stack of optical fiber ribbons (12) therein, a jacket (20), and strength sections (30). Jacket (20) includes a non-uniform profile with close profile sections (22) and extended profile sections (26). Strength sections (30) comprise extended profile sections (26), dielectric strength rods (32), and ripcords (34) disposed between the strength rods. When it is desired to prepare fiber optic cable (10) for a cable pulling operation, portions of extended profile sections (26) are removed thereby exposing strength rods (32) and grip surfaces (22a) for receiving a pulling-grip (40). The compact size, flexibility, and light-weight construction of fiber optic cable (10) makes it a craft-friendly cable which is easy to route through cable passageways during the cable pulling operation.

21 Claims, 5 Drawing Sheets

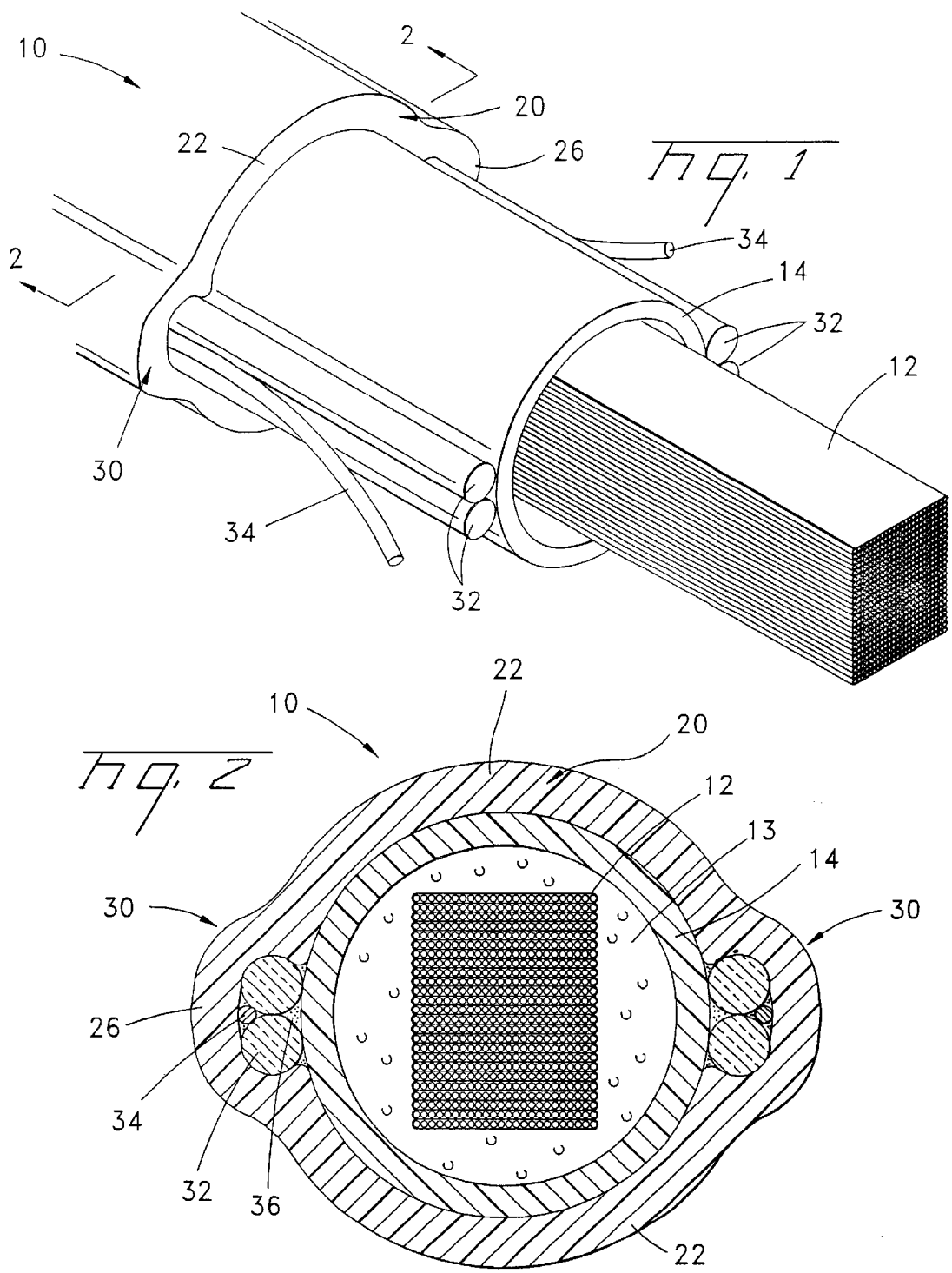

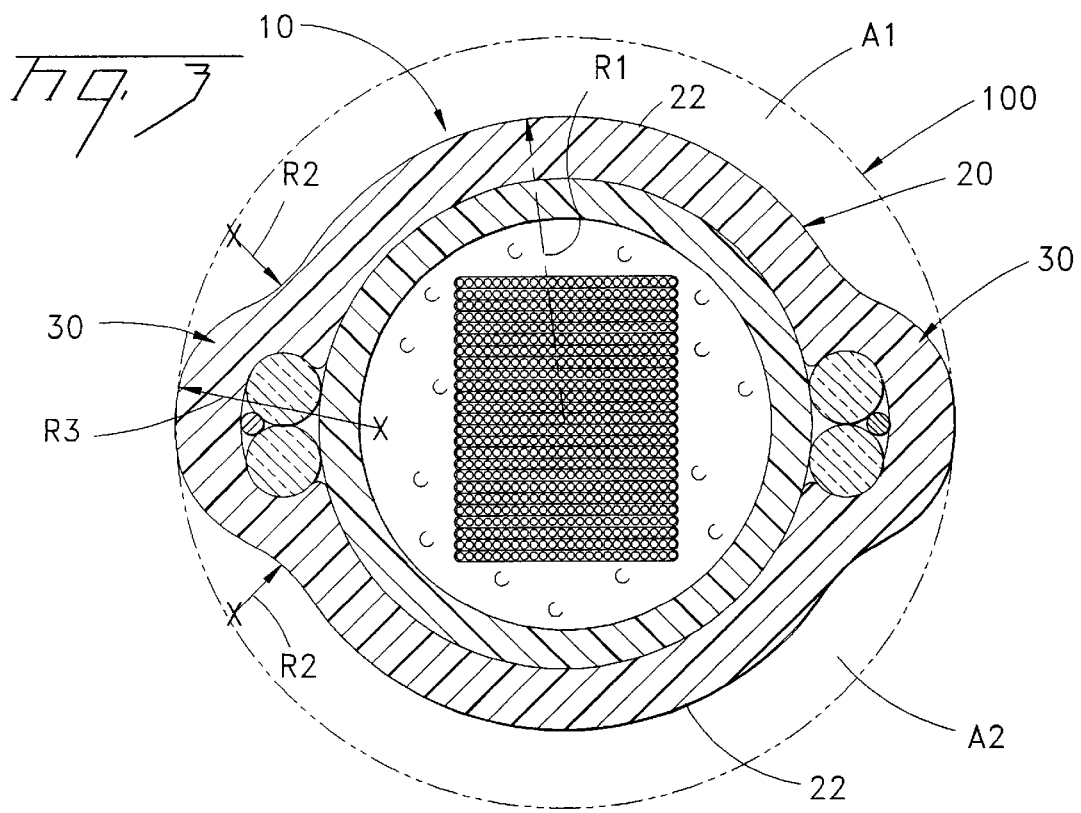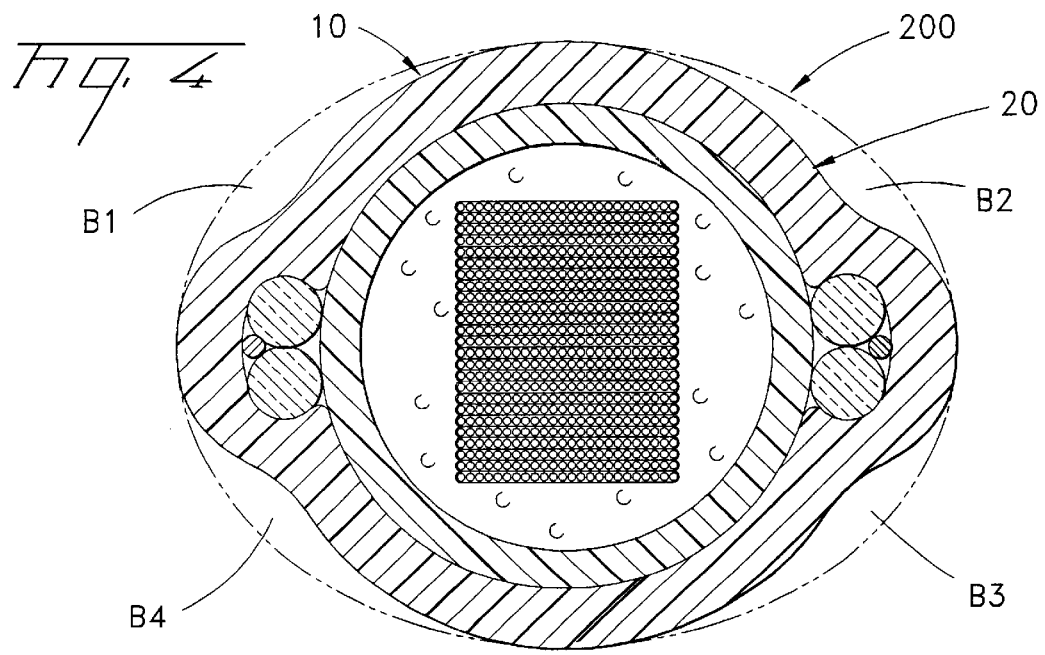

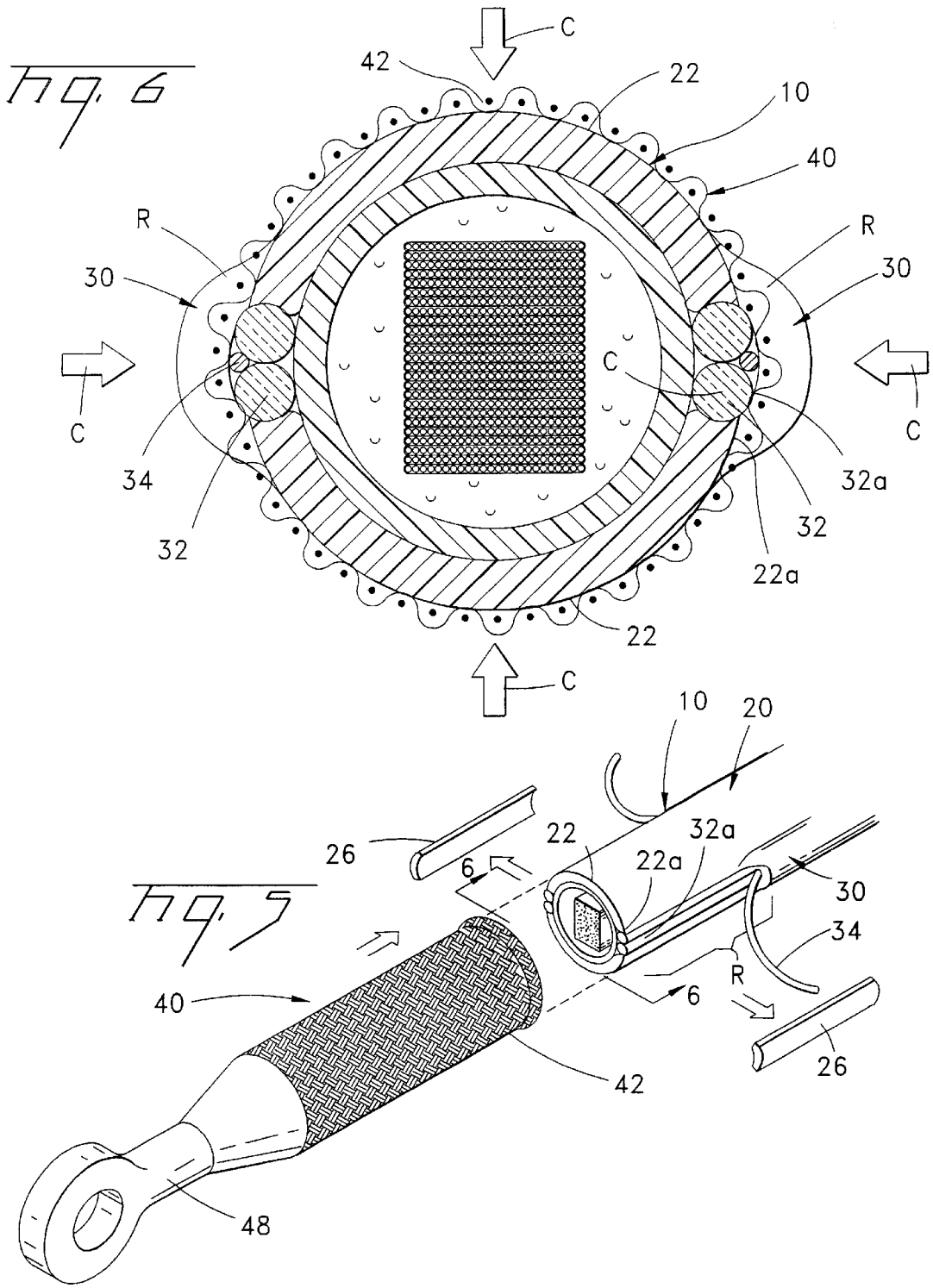

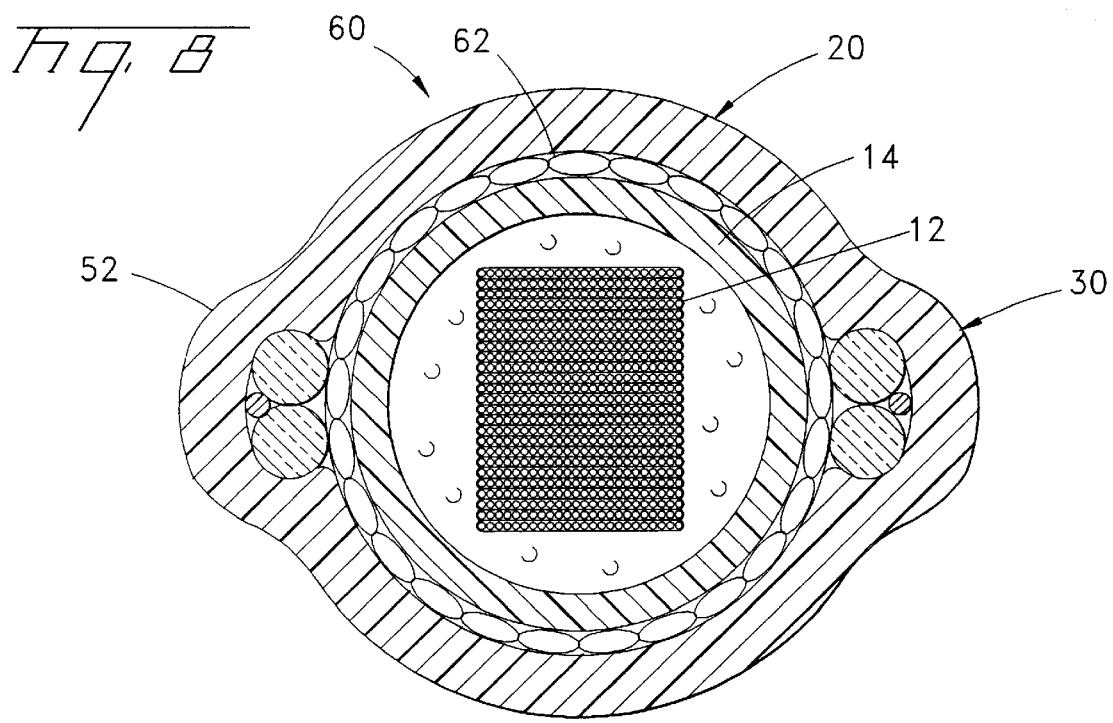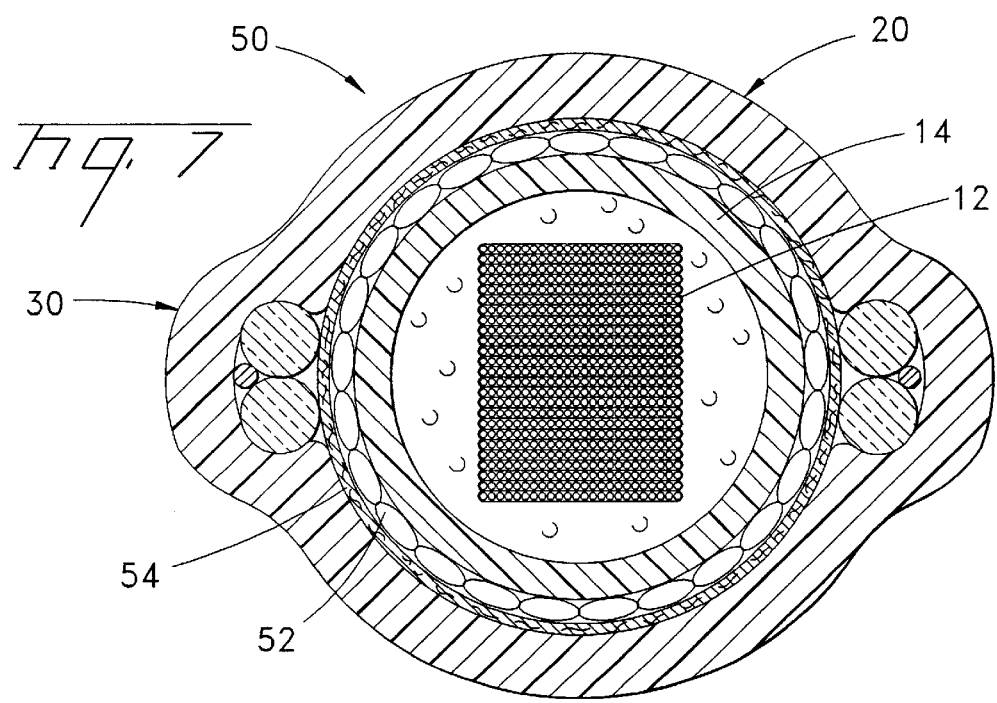

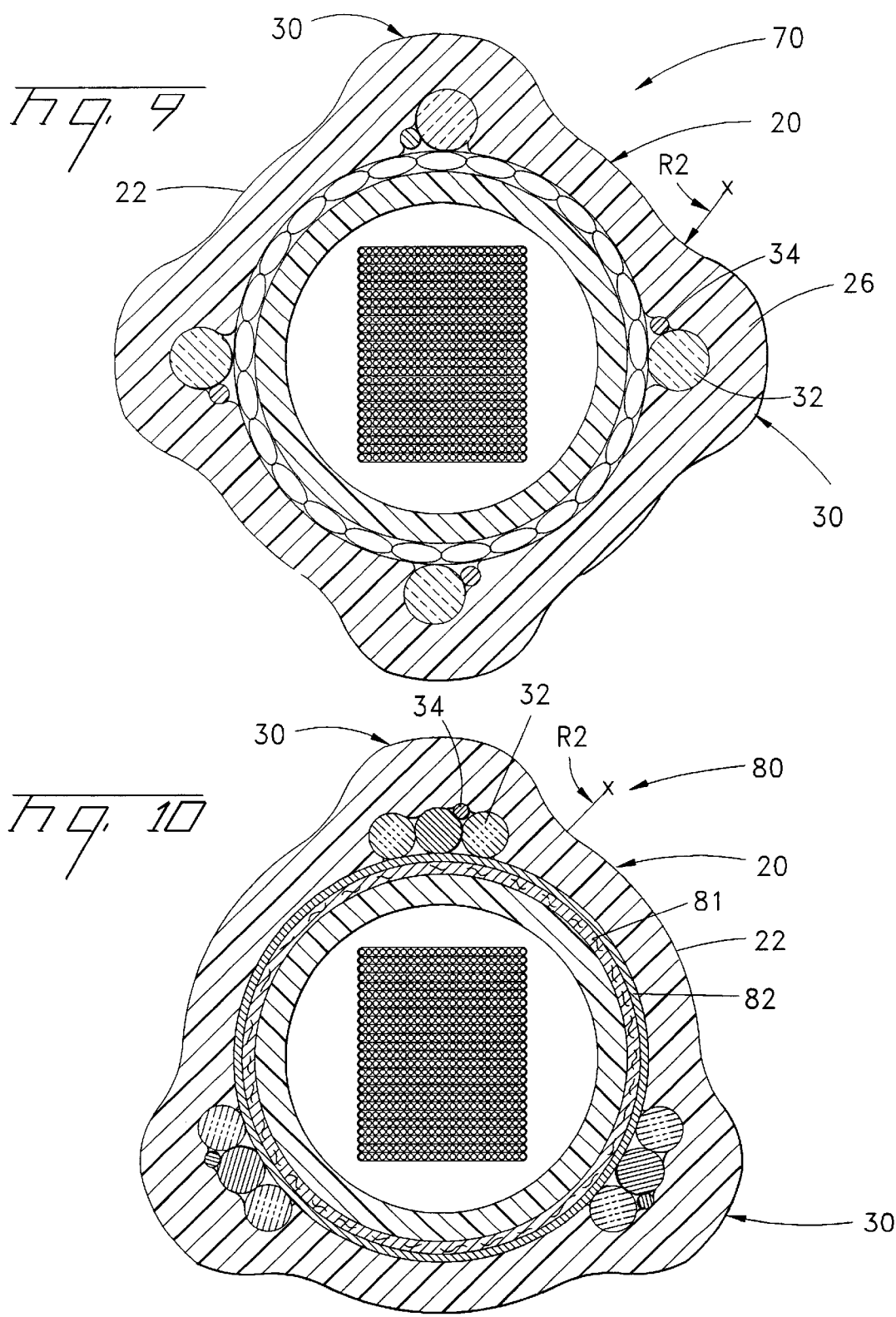

FIBER OPTIC CABLE

The present invention relates to a fiber optic cable and, more particularly, to a fiber optic cable having optical fibers loosely disposed in a core tube.

BACKGROUND OF THE INVENTION

Conventional fiber optic cables include optical fibers which are capable of transmitting voice, television, and computer data information. Fiber optic cables designed for indoor, outdoor, or indoor/outdoor applications may be of the monotube type. The monotube design includes a single tube which surrounds optical fibers loosely disposed in the tube. An example of a commercially available monotube type fiber optic cable is an SST-Ribbon Cable made by SIECOR Corporation of Hickory, N.C.

A fiber optic cable should have a craft-friendly construction which permits ease of installation. Installation of a fiber optic cable typically requires the pulling of a cable through a passageway. The passageways are, for example, ducts, tubes, cable enclosures, or splice boxes which may not afford much room for the pulling of the fiber optic cable. Pulling-grips have been developed to facilitate the pulling of a fiber optic cable through a passageway. A pulling-grip, such as a standard fiber optic pulling-grip made by the Lewis Manufacturing Company, includes a woven steel braid section attached to a pulling eye. In a typical operation of the pulling-grip, the craftsman places the braided section over the end of a prepared end of a fiber optic cable, and then the pulling eye is pulled into the passageway. Pulling on the pulling eye causes the woven braided section to contract about the outer jacket of the fiber optic cable, thereby gripping the jacket in a fashion similar to the action of a "Chinese finger" toy.

The ease with which a fiber optic cable is routed through a passageway is dependent on certain characteristics of the fiber optic cable. For example, craftsmen have found that contact surface area for a braided section of a pulling-grip is maximized by a round profile fiber optic cable thereby avoiding slippage or disconnection of the pulling-grip during the cable pulling operation. Additionally, a light-weight cable is generally easier to pull than a heavy cable. Cable flexibility is a factor as the use of stiff cable components makes the cable difficult to bend during the cable pulling operation. Cable size is also a factor as a cable with a small cross sectional area is generally easier to pull through a narrow passageway than a cable with a large cross sectional area. Moreover, apart from ease of installation, the potential for undesirable temperature effects and the cost per unit length of the cable may be important factors in deciding between commercially available fiber optic cables.

Taking the foregoing factors into consideration, several monotube type fiber optic cable designs comprise part of the background of the present invention. For example, a monotube fiber optic cable which may be difficult to route through a passageway is disclosed in U.S. Pat. No. 5,029,974. This known fiber optic cable includes two steel strength members embedded in a round profile outer cable jacket. The steel strength members are designed to resist axial compression due to, for example, aging shrinkage or thermal contraction of the cable jacket. Resistance to axial compression and tension prevents stress being applied to the core tube and/or buckling of the fiber optic cable. Axial compression or tension on the cable jacket may otherwise cause attenuation in, or breakage of, optical fibers in the core tube. However, the use of steel strength members creates a spark hazard and their weight may negatively effect the cable pulling operation. Additionally, the round profile jacket is formed of a relatively significant quantity of plastic material, which increases the weight, size, stiffness, and cost per unit length of the cable.

Another monotube type fiber optic cable which may be difficult to route through passageways is disclosed in U.S. Pat. No. 4,844,575. This known cable is of the composite cable type and includes a monotube with optical fibers therein, and steel strength members with adjacent electrical conductors which are surrounded by an oval profile cable jacket. The electrical conductors contribute to the weight, stiffness, and cost of the cable and may make a craftsman's access to optical fibers difficult. Furthermore, the oval profile jacket requires a relatively significant quantity of plastic material, which further increases the weight, size, stiffness, and cost of the cable. Other composite cables having non-circular profiles which may experience at least the same disadvantages are disclosed in U.S. Pat. No. 5,469,523 and U.S. Pat. No. 5,039,195.

Another fiber optic cable which may be difficult to route through enclosures is disclosed in U.S. Pat. No. 4,610,505. This known fiber optic cable includes strength members which have a thermal characteristics mismatch relative to the optical fibers therein. The strength members are surrounded by engaging members which include wires helically wrapped around the strength members. The strength members with wires are then lashed to an optical fiber cable with glass or metallic lashing wires, which lashing wires are surrounded by a non-circular profile jacket. The engaging members, strength members, helically wrapped wires, lashing wires, and non-circular profile jacket disadvantageously increase the weight, stiffness, size, and cost of the fiber optic cable and increase the difficulty of manufacturability of the cable. Furthermore, the flat sides of the noncircular profile jacket do not present an optimal amount of contact surface area with a standard pulling-grip which may result in slippage during pulling of the fiber optic cable.

Examples of fiber optic cables which include a circular profile jacket are disclosed in U.S. Pat. No. 5,109,457 and U.S. Pat. No. 5,509,097. Each one of these known fiber optic cables comprises a monotube design with non-metallic strength members. The circular profile jacket of each cable is expensive because it requires a significant quantity of plastic material. Moreover, U.S. Pat. No. 5,509,097 has large interstices adjacent to the strength members which interstices must be filled with a quantity of water blocking material thereby adding to the cost of the cable and rendering manufacturability of the cable difficult. U.S. Pat. No. 5,109,457 requires a water blocking tape adjacent the strength members thereby increasing the cost of the cable.

OBJECTS OF THE INVENTION

It is an object of the present invention to provide a fiber optic cable which is easy to route through passageways.

It is another object of the present invention to provide a flexible, light-weight fiber optic cable which is of a low cost per unit length.

It is another object of the present invention to provide a fiber optic cable which is capable of reliable use with a pulling-grip.

BRIEF DESCRIPTION OF THE DRAWINGS

FIG. 1 shows an isometric view of a fiber optic cable according to a first embodiment of the present invention.

FIG. 2 shows a cross sectional view of the fiber optic cable of FIG. 1 taken across line 2—2.

FIG. 3 shows the cross section of FIG. 2 with a prior art circular profile jacket shown with a phantom line.

FIG. 4 shows the cross section of FIG. 2 with a prior art oval profile jacket shown with a phantom line.

FIG. 5 shows an isometric view of the fiber optic cable of FIG. 1 after the fiber optic cable has been prepared for receiving a cable pulling grip.

FIG. 6 shows the prepared fiber optic cable of FIG. 5 with the braided section of the cable pulling grip in gripping relation with the prepared end of the fiber optic cable.

FIG. 7 shows a cross section of a fiber optic cable according to second embodiment of the present invention.

FIG. 8 shows a cross section of a fiber optic cable according to a third embodiment of the present invention.

FIG. 9 shows a cross section of a fiber optic cable according to a fourth embodiment of the present invention.

FIG. 10 shows a cross section of a fiber optic cable according to a fifth embodiment of the present invention.

DETAILED DESCRIPTION OF THE INVENTION

Referring to FIGS. 1–4, a fiber optic cable 10 according to the present invention will be described. Fiber optic cable 10 includes a stack of optical fiber ribbons 12 within a core tube 14, and core tube 14 is surrounded by a jacket 20. Core tube 14 is preferably crush resistant and may include a water blocking material 13 therein, for example, a conventional water blocking grease or gel. Fiber optic cable 10 includes strength sections 30 disposed at generally diametrically opposed locations relative to a center of cable 10. In a preferred embodiment of the present invention, fiber optic cable 10 is a flexible, all dielectric cable which is of a compact size, is light in weight, and is of a low cost to produce.

Jacket 20 is preferably formed of a medium density polyethylene (MDPE) material shaped into a non-uniform profile. The non-uniform profile comprises close profile sections 22 and extended profile sections 26. As discussed in more detail below, extended profile sections 26 comprise generally rounded profiles and extend radially outwardly of generally circular close profile sections 22.

Strength sections 30 resist axial compression and tension in fiber optic cable 10. Each strength section 30 preferably includes two strength members, for example, rods 32 formed of a low-cost dielectric material, for example, a flexible glass reinforced plastic material sold under the trade-name HERCUFLEX. Alternatively, rods 32 may comprise GRP rods or steel cables. Ripcords 34 are located between respective strength rods 32 of respective strength sections 30. Each strength section 30 includes a respective extended profile section 26 which extends around strength rods 32 and ripcord 34. Strength rods 32 preferably include a coating 36 comprising a superabsorbent material which is operative as a waterblocking agent in the interstices of strength sections 30.

Manufacture of cable 10 is preferably accomplished by a conventional extrusion operation whereby the MDPE material of jacket 20 is tubed on core tube 14 with an extruder apparatus (not shown). The tube-on process may be accomplished by extruding an essentially uniform thickness of MDPE about tube 14, strength rods 32, and respective ripcords 34. A vacuum is applied during the extrusion operation to pull jacket 20 radially tightly against tube 14 and rods 32, with ripcords 34 tucked in the respective interstices between strength rods 32. The tube-on process is advantageous because a standard extrusion tip is sized so that strength rods 32 may easily pass therethrough. A vacuum plate at the back of the extruder seals the vacuum, and the plate includes holes for guiding strength rods 32 and ripcords 34. Alternatively, jacket 20 may be pressure extruded about tube 14 using a die with a die orifice having a shape complementary to that of the non-uniform profile of cable 10.

Referring to FIG. 3, the non-uniform profile of jacket 20 comprises several radii, namely: radii R1 generally centered at the center of cable 10 and which correspond to close profile sections 22; transition radii R2 centered exteriorly of cable 10 and which correspond to arcuate transitions between close profile sections 22 and extended profile sections 26; and radii R3 centered within cable 10 corresponding to the rounded shape of extended profile sections 26. Cable 10 may be installed in an enclosure and sealed with an off-the-shelf grommet. Additionally, transition radii R2 preclude the formation of sharp corners or creases in jacket 20 thereby avoiding stress cracking of jacket 20 during flexing or thermal cycling of fiber optic cable 10. Radii R1,R2,R3 may comprise respective constant radii of curvature as with an arc of a circle, or respective varying radii of curvature.

The non-uniform profile of cable 10 is advantageous because, as shown in FIG. 3, the amount of MDPE material needed to form jacket 20 is minimized. To illustrate this advantage, a prior cable jacket circular profile 100 is superimposed about fiber optic cable 10. The material and size differences between profile 100 and the non-uniform profile of cable 10 are indicated by areas A1 and A2. Furthermore, as illustrated in FIG. 4, areas B1,B2,B3,B4 indicate the differences between the non-uniform profile of cable 10 and a prior cable jacket oval profile 200. The non-uniform profile minimizes the material and size of cable jacket 20, and, in combination with flexible strength sections 30, results in a craft-friendly fiber optic cable 10 which is easy to route through passageways. Moreover, the preferably all dielectric construction of fiber optic cable 10, and the use of less jacket material, minimizes the cost per unit length of fiber optic cable 10.

In a further advantage of the present invention, fiber optic cable 10 is a craft-friendly cable readily useable with a standard pulling-grip 40 (FIG. 5). Pulling-grip 40 includes a braided section 42 and a pulling eye 48. In preparing an end of fiber optic cable 10 for the pulling operation, a craftsman will generally use a cutting knife to remove extended sections 26. The extended positions of extended sections 26 indicate to the craftsman where best to cut jacket 20 in order to access ripcords 34 and strength rods 32. The craftsman then removes extended sections 26, and exposes strength rods 32 and respective ripcords 34. In doing this, the craftsman creates grip sections R thereby shaping a generally round outer profile of a prepared end of cable 10 including close profile sections 22 and grip sections R. It is notable that during the removal of extended sections 26, the knife will not inadvertently cut ripcords 34 because they are in a protected position between respective strength rods 32. Moreover, removal of sections 26 reduces the outside diameter of the prepared end of fiber optic cable 10 so that when braided section 42 is placed therearound the outside diameter of the braided section will be minimized during the pulling operation. Next, braided section 42 is placed over the prepared end of fiber optic cable 10 (FIG. 6) and pulling eye 48 is attached to a pulling cable (not shown).

As pulling eye 48 is pulled, braided section 42 contracts about fiber optic cable 10 in the respective directions of arrows C (FIG. 6) thereby tightly gripping close profile sections 22 and strength rods 32. According to another advantage of the present invention, close profile sections 22 are sized so that, when grip sections R are made, grip surfaces 22a are formed generally radially even with close profile sections 22. Grip surfaces 22a generally radially fall between an outermost grip surface 32a of strength rods 32 and respective centers C of strength rods 32 (FIG. 6). Strength rods 32 protrude away from surfaces 22a, which assures that braided section 42 will firmly grip both of the close profile sections 22 and strength rods 32, whereby strength rods 32 will absorb some of the tensile forces associated with the cable pulling operation. However, outermost grip surfaces 32a do not separate braided section 42 from jacket 20 to the point of creating a large gap therebetween, but rather, a tight fit is maintained for avoiding slippage. The firm grip of pulling-grip 40 on the prepared end of fiber optic cable 10 minimizes slippage during the cable pulling operation, and the compact size, flexibility, and light weight of fiber optic cable 10 make it ideal for pulling through passageways. When the pulling operation is completed, pulling-grip 40 is removed. Ripcords 34 are used to remove jacket 20 to gain access to the optical fibers in cable 10, and strength rods 32 may be fixed to a cable enclosure. As an alternative to a pulling-grip, cable 10 may be installed applying a cable-jetting apparatus which uses pressurized air to force the cable into a passageway.

FIG. 7 shows a fiber optic cable 50 according to a second embodiment of the present invention. For increased tensile strength, core tube 14 is surrounded by strength members, for example, impregnated fiberglass rovings 52 wound in a preferably helical direction of lay. To provide waterblocking protection, rovings 52 are surrounded by a water blocking tape 54 preferably longitudinally disposed about tube 14. Strength sections 30 are located radially outwardly of tape 54. Jacket 20 may be tubed-on or pressure extruded about tape 54.

FIG. 8 shows a fiber optic cable 60 according to a third embodiment of the present invention. For increased tensile strength, core tube 14 is surrounded by impregnated fiberglass rovings 62 wound in a preferably helical direction of lay. Strength sections 30 are located radially outwardly of rovings 62. Jacket 20 may be tubed-on or pressure extruded about rovings 62.

Although the invention has been described with reference to fiber optic cables 10,50,60 having two generally opposing strength sections 30 with two dielectric strength rods, the invention may be practiced with more or less strength sections having more or less strength rods of a dielectric or metallic type. For example, as shown in FIG. 9 a fiber optic cable 70 according to the present invention comprises four strength sections with one strength rod 32 per strength section. As shown in FIG. 10, the invention may be practiced in the embodiment of a fiber optic cable 80 having three strength sections each having three steel strength members. Cable 80 also includes a water swellable tape layer 81 and an armor layer 82. It is preferred that strength sections 30 are generally equally spaced about a center of the fiber optic cable.

The present invention has thus been described with reference to the foregoing embodiments, which embodiments are intended to be illustrative of the inventive concept rather than limiting. Persons of skill in the art will appreciate that variations and modifications of the foregoing embodiments may be made without departing from the scope of the appended claims. For example, although the invention has been described with reference to fiber optic ribbons, loose or bundled optical fibers may be used as well.

Accordingly, what is claimed is:

1. A fiber optic cable comprising:
    a plastic core tube with at least one optical fiber therein;
    a jacket surrounding said core tube, said jacket comprising a jacket thickness and a non-uniform profile;
    said non-uniform profile comprising at least one strength section, said strength section comprising an extended profile section extending away from close profile sections of said jacket, said strength section includes at least two flexible dielectric strength members being generally in contact with each other and with the plastic core tube and having respective diameters that are generally larger than the thickness of said jacket.

2. The fiber optic cable of claim 1, wherein said close profile sections comprise generally circular profiles.

3. The fiber optic cable of claim 1, wherein said non-uniform profile comprises transition radii formed between said extended profile section and said close profile sections for avoiding stress cracking of said jacket.

4. The fiber optic cable of claim 3, wherein said transition radii are centered exteriorly of said fiber optic cable.

5. The fiber optic cable of claim 1, wherein said fiber optic cable is an all dielectric fiber optic cable.

6. The fiber optic cable of claim 1, wherein said strength member comprises a strength rod.

7. The fiber optic cable of claim 1, wherein said fiber optic cable comprises at least two of said strength sections.

8. The fiber optic cable of claim 1, wherein at least one of said strength sections comprises a ripcord disposed generally between said at least two strength members.

9. A fiber optic cable for use with a pulling-grip, said fiber optic cable comprising:
    a plastic tube with at least one optical fiber therein; a jacket surrounding said plastic tube, said jacket comprising a jacket thickness and a non-uniform profile; said non-uniform profile comprising extended profile sections extending away from generally close profile sections, said extended sections respectively including at least two dielectric strength members, said dielectric strength members being generally rod-shaped and being generally in contact with each other and generally in contact with said plastic tube, said strength members further comprising respective diameters that are generally larger than the thickness of said jacket; wherein said extended sections comprise respective removable sections, whereby removal of said removable sections from an end of said cable exposes said respective strength members and defines a prepared end of said fiber optic cable for receiving a pulling-grip.

10. The fiber optic cable of claim 9, wherein at least one of said close profile sections is sized so that when said prepared end is made grip surfaces of said jacket are defined adjacent said respective strength members, said grip surfaces being generally radially even with said close profile section for receiving said pulling-grip.

11. The fiber optic cable of claim 10, wherein said grip surfaces are disposed generally radially between respective outermost grip surfaces of said respective strength members and a center of said strength members for receiving said pulling-grip.

12. The fiber optic cable of claim 10, wherein respective portions of said respective strength members protrude away from respective said grip surfaces for receiving said pulling-grip.

13. The fiber optic cable of claim 9, wherein said strength members are dielectric strength members.

14. A fiber optic cable comprising:
a plastic tube with at least one optical fiber therein;
a jacket surrounding said plastic tube, said jacket comprising a non-uniform profile;
said non-uniform profile comprising at least one strength section, said strength section comprising an extended profile section extending away from close profile sections of said jacket, said strength section includes at least two dielectric strength members, said strength members having diameters generally larger than a thickness of said jacket and being in general contact with each other and with said plastic tube and having a coating comprising a waterblocking agent for at least partially blocking the flow of water in said strength section.

15. A fiber optic cable comprising:
a core tube comprising a plastic material, said core tube having at least one optical fiber therein;
a jacket surrounding said core tube, said jacket comprising a non-uniform profile;
said non-uniform profile comprising at least one strength section, said strength section comprising an extended profile section extending away from close profile sections of said jacket, said strength section includes at least two dielectric strength members having diameters generally larger than a thickness of said jacket and a ripcord located generally between said strength members.

16. The fiber optic cable of claim 15, said ripcord being located generally in an interstice between said strength members.

17. A fiber optic cable comprising:
a non-metallic core tube with at least one optical fiber therein;
a jacket surrounding said core tube, said jacket comprising a non-uniform profile;
said non-uniform profile comprising at least two strength sections, said strength sections being adjacent to respective extended profiles of said jacket extending away from close profile sections of said jacket, said strength sections each comprising at least one respective dielectric strength member, at least one of said strength members comprising an outside diameter generally larger than a thickness of said jacket and an outer surface generally in contact with a portion of said non-metallic core tube.

18. The fiber optic cable of claim 17, said strength member including a coating.

19. The fiber optic cable of claim 18, said coating comprising a super-absorbent material.

20. The fiber optic cable of claim 17, said strength member comprising a metallic portion.

21. The fiber optic cable of claim 17, each said strength section comprising at least two strength members.

* * * * *